(12) United States Patent
Eleftheriou et al.

(10) Patent No.: US 7,207,119 B1
(45) Date of Patent: Apr. 24, 2007

(54) CONTROLLER

(75) Inventors: Evangelos S. Eleftheriou, Zurich (CH); Angeliki Pantazi, Kilchberg (CH); Charalampos Pozidis, Gattikon (CH); Abu Sebastian, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/297,104

(22) Filed: Dec. 8, 2005

(51) Int. Cl.
*G01B 5/20* (2006.01)

(52) U.S. Cl. .................... 33/551; 33/613; 250/306; 977/850

(58) Field of Classification Search ............ 33/551, 33/556, 613, 645; 250/306, 307; 977/849, 977/850, 860
See application file for complete search history.

(56) References Cited

U.S. PATENT DOCUMENTS

| | | | |
|---|---|---|---|
| 5,877,497 A * | 3/1999 | Binnig et al. | 250/306 |
| 5,939,719 A * | 8/1999 | Park et al. | 250/306 |
| 6,265,718 B1 * | 7/2001 | Park et al. | 250/307 |
| 6,448,553 B1 * | 9/2002 | Itsuji et al. | 250/306 |
| 6,798,226 B2 * | 9/2004 | Altmann et al. | 324/754 |
| 7,098,678 B2 * | 8/2006 | Altmann et al. | 324/754 |
| 2006/0174384 A1 * | 8/2006 | Roessler et al. | 977/863 |
| 2006/0243034 A1 * | 11/2006 | Chand et al. | 73/105 |

* cited by examiner

*Primary Examiner*—G. Bradley Bennett
(74) *Attorney, Agent, or Firm*—Stephen C. Kaufman (57) ABSTRACT

The present invention relates to a controller comprising: at least two input terminals, each of which is configured to receive one of at least two input signals comprising information on a positioning of a scanner relative to a reference medium, and an output terminal, which is connectable to the scanner and configured to transmit an output signal, which is used for controlling the positioning of the scanner, wherein the controller further comprises: a processing unit being operable to designate a corresponding weighting function to each of the at least two input signals, a magnitude of the corresponding weighting function being selected to be in accordance with a noise profile of the input signal to which it has been designated; the processing unit further being operable to simultaneously use the at least two input signals, each with the corresponding weighting function designated thereto, to design a transfer function of the controller for use in the production of the output signal.

16 Claims, 9 Drawing Sheets

CONTROLLER

FIELD OF THE INVENTION

The present invention relates to a controller, particularly for controlling a scanner scanned relative to a reference medium. The present invention also extends to a system implementing such a controller and to a method for controlling a scanner scanned relative to a reference medium.

TECHNICAL BACKGROUND

Progress in the field of scanning probe microscopy SPM has led to the development of new data storage concepts. Specifically, data storage devices such as probe-storage devices have been introduced. These devices have ultra-high storage density and are based on the developments in scanning tunnellng microscopy STM and atomic force microscopy AFM.

An example of a probe-storage device is disclosed in, "The millipede—more than 1,000 tips for future AFM data storage", by P. Vettiger et al., IBM Journal Research Development, Vol. 44, No. 3, March 2000. This device is based on a thermomechanical principle for storing and/or retrieving information written on a data storage medium. Digital information is stored by using the tip of an AFM cantilever probe having a nanoscale diameter to make indentations of comparable size on the data storage medium. An indentation indicates the presence of information and denotes a binary "1" whereas the absence of an indentation denotes a binary "0". The indentations are written on multiple tracks that are aligned with a track centre-line TCL and are accessed by scanning the probe with respect thereto. For increased data rate, an array of such probes is used with each probe performing read/write/erase operations over an individual data storage field with an area of, for example, 100 µm by 100 µm.

As mentioned above, the indentations produced on the data storage medium have a comparable size to the tip-diameter of the probe by which they are produced. Typically, an indentation produced in this manner has a conical shape and a diameter of approximately 15 to 30 nm. The accuracy with which the probe positioning, especially when implemented in an array, is conducted with respect to the data storage medium, particularly to access the indentations, plays a role in determining the performance of a data storage device so produced.

It is known to achieve probe-positioning above a data storage medium by using a miniaturised micro-electromechanical system (MEMs) scanner with motion capabilities of, for example, 120 µm in the x and y domains. A control architecture for such a scanner has been disclosed in, "A servo-mechanism for a micro-electro-mechanical-system-based scanning probe storage device" by A. Pantazi et al., Nanotechnology, Vol. 15, pages 612–621, August 2004, in which the x-y positional information of the probes was achieved by thermal position sensors. A closed loop positioning resolution of approximately 2 nm was demonstrated by use of the thermal sensors.

Thermal positioning sensors are a type of global positioning sensor in that their operational capability can span the entire range and/or a sub-range of typical scanners making them effective in providing global positioning information. Global positioning information is information that allows positioning over a range that spans several tracks. Although thermal sensors have a reduced noise component at higher frequencies, for example, $\geq 50$ Hz, this is not the case at lower frequencies, for example, <50 Hz, where ambient temperature variations cause the onset of drift and a noise component that is unsuitable for sensing purposes. Hence, a mechanism for probe-positioning based solely on thermal sensors may not be suitable for long term operation of a probe-storage device.

The specific implementation of multiple probes arranged in an array, where some of the probes and their associated storage fields have been dedicated to the generation of a media-derived position error signal, abbreviated to PES, has been used in a previously-proposed probe positioning technique.

The media-derived PES signal captures deviation of a probe positioning from the track centre-line associated to each data track on a data storage medium. However, although it does not suffer from drift, it has a limited dynamic range, for example, of approximately 50 nm, and a limited operational bandwidth. Putting this in perspective with regard to, for example, a probe storage device where it is desired to position multiple probes with nanometer-scale precision in dedicated data storage fields typically of 100 µm by 100 µm size, a feedback scheme relying solely on a media-derived PES signal may not prove effective.

Accordingly, it is desirable to provide a positioning mechanism for a scanner relative to a data storage medium with global and/or nanometer scale positioning capability and that uses any sensors employed for this purpose more effectively.

SUMMARY OF THE INVENTION

According to an embodiment of a first aspect of the present invention, there is provided a controller comprising: at least two input terminals, each of which is configured to receive one of at least two input signals comprising information on a positioning of a scanner relative to a reference medium, and an output terminal, which is connectable to the scanner and configured to transmit an output signal, which is used for controlling the positioning of the scanner, wherein the controller further comprises: a processing unit being operable to designate a corresponding weighting function to each of the at least two input signals, a magnitude of the corresponding weighting function being selected to be in accordance with a noise profile of the input signal to which it has been designated; the processing unit further being operable to simultaneously use the at least two input signals, each with the corresponding weighting function designated thereto, to design a transfer function of the controller for use in the production of the output signal.

The controller is used for controlling the positioning of a scanner such as, for example, a scanner relative to a reference medium with respect to which it is scanned. The reference medium may, for example be, a data storage medium or any other substrate of interest.

The present invention is based on the realisation that positioning sensors have distinct noise performance characteristics and uses this to advantage in that, out of multiple positioning sensors, a sensor with the better suitable noise profile is chosen to determine the positioning of the scanner relative to the reference medium. Factors on which such suitability is determined will be discussed herebelow.

A "multiple-input, single-output" MISO framework is used in the controller. Specifically, multiple sensing signals informing on the positioning of the scanner relative to a reference medium, for example, a data storage medium, are received from multiple positioning sensors by a corresponding number of input terminals of the controller. A corresponding weighting function is designated to each of the multiple sensing signals received by the controller. The magnitude of the weighting function is chosen in accordance with the noise profile of the input signal to which it is designated. The weighted input signals are then used in the design of the transfer function of the controller, which is used to produce an output signal for controlling the scanner positioning relative to the data storage medium.

The output signal produced in the above-described manner is a function of all the sensing signals received at the input terminals of the controller. In other words, the multiple sensing signals are used simultaneously in the production of the output signal and it is not the case that any of the sensing signals is disabled in favour of another. The latter factor would be undesirable in that it would increase technical complexity, result in inefficient usage of both technical and power resources, and be time-inefficient. It is more the case that a sensing signal exhibiting performance characteristics, for example, on the basis of having a lower noise component out of the multiple sensing signals, which makes it more suitable for positioning the scanner out of the multiple sensing signals received at the input terminals of the controller, is selected by amplifying a corresponding weighting function designated thereto.

Preferably, in an embodiment according to the first aspect, the magnitude of the corresponding weighting function is selected to be in accordance with the noise profile of the input signal to which it has been designated in a predetermined frequency domain.

The suitability of the sensing signals for producing an output signal to be used for positioning the scanner relative to the data storage medium may be based on their respective noise profiles in predetermined frequency bands. For example, frequency division control is exercised in that, if a first sensing signal is known to have a reduced noise component compared to a second sensing signal in a specific frequency band, then the magnitude of the weighting function designated to the first sensing signal is increased compared to the one designated to the second sensing signal in that frequency band.

Preferably, an embodiment according to the first aspect further comprises a drift estimation unit operable to estimate and/or correct for an effect of drift in any one of the at least two input signals.

The noise performance characteristics of global sensors, in particular, thermal sensors, are deteriorated by the onset of drift and so would impair the ability of a positioning mechanism using such a sensor to obtain and/or provide global positioning information. Here, these undesirable effects are reduced by the estimation of and/or correction of the effects of drift on a sensing signal, particularly, a thermal sensing signal, received at the input terminals of the controller.

Desirably, in an embodiment according to the first aspect, the processing unit is further operable to use a tracking error function to design the transfer function of the controller.

Disturbances, for example, vibrations and mechanical shocks, are taken into account in the design of the transfer function of the controller, which is used in the production of the output signal, via a tracking error function. In this way, the effects of these disturbances on the scanning motion of the scanner are reduced.

Preferably, in an embodiment according to the first aspect, the processing unit is further operable to use the tracking error function in order to select a bandwidth of operation of the scanner.

In a specified bandwidth of operation of the scanner, it is, of course, desirable to reduce the tracking error of the controller, i.e. that the scanner is positioned off-track relative to a target track. A factor in reducing the tracking error is minimizing disturbances, for example, vibrations, mechanical shocks, and/or the effects thereof on the controller. This is implemented by increasing the gain of the tracking error function.

Regarding disturbances, scanners such as those that would typically be used with the controller are affected adversely by a phenomenon known as cross-coupling where coupling between the x- and y-motion signals of the scanner occurs. Clearly, it is desirable to reduce the effects of cross-coupling. Here, this is done by modelling the cross-coupling as a disturbance signal to be rejected. Specifically, since the contribution of cross-coupling to the disturbance signal d is higher than the other aforementioned disturbances at operational frequencies between 0 to 20 Hz of the scanner, the gain of the tracking error function is amplified at such frequencies.

Preferably, in an embodiment according to the first aspect, the processing unit is further operable to use a scaling function to design the transfer function of the controller, a magnitude of the scaling function being selected to be in accordance with a magnitude of the output signal.

It is desirable to reduce the power dissipated by the scanner. For this purpose, a scaling function is used in the design of the transfer function of the controller in order to control the magnitude of the output signal and, by this virtue, impose a power dissipation constraint on the scanner.

Desirably, a linear fractional transformation of the transfer function of the controller, a transfer function of the scanner controlled in accordance with the controller, the corresponding weighting function designated to each of the at least two input signals, the tracking error function and the scaling function is $\leq 1$.

One of the performance objectives of the controller is to achieve positioning of a scanner relative to a reference medium on both a global and nanometer-scale. When the controller performance meets the aforementioned performance objectives, a linear fractional transformation of the transfer function of the controller, a transfer function of the scanner controlled by the controller, the weighting functions, the tracking error function and the scaling function is $\leq 1$. In other words, monitoring the value of the above-described linear fractional transformation may be used to inform on whether the controller is performing optimally or not.

Preferably, in an embodiment according to the first aspect, one of the at least two input signals is a thermal sensing signal.

The operation capability of thermal sensors spans the entire range and/or sub-range of scanners such as scanners, which makes them suitable for providing global positioning information.

Preferably, in the above-described embodiment, the magnitude of the weighting function designated to the thermal sensing signal is selected to be in accordance with the noise profile of the thermal sensing signal in the predetermined frequency domain comprising 50 Hz to 500 Hz.

Thermal sensors have an increased noise component at lower frequencies, for example, <50 Hz, due to drift and a comparably reduced noise component at higher frequencies, for example, at $\geq 50$ Hz. Here, this property is exploited in that, at the aforementioned higher frequencies, a thermal sensing signal received by the controller is dominantly used out of all of the received multiple sensing signals. This is done by setting the magnitude of the weighting function corresponding to the thermal sensing signal to be higher than the weighting functions corresponding to the other sensor signals in a frequency band of 50 Hz to 500 Hz.

Desirably, in an embodiment according to the first aspect, the other of the at least two input signals is a media-derived position error signal.

It is desired to achieve positioning of the scanner with nanometer-precision with respect to a reference point on a data storage medium such as, for example, a data track and/or with respect to a track centerline thereof. For this purpose, a media-derived position error signal PES is used.

In the above-described embodiment, the magnitude of the weighting function designated to the media-derived position error signal is selected to be in accordance with the noise profile of the media-derived position error signal in the predetermined frequency domain comprising 0 to 2 Hz.

The capability of thermal sensors to provide positioning information deteriorates at lower frequencies, for example, <50 Hz, due to the onset of drift. Here, this problem is circumvented by dominantly using media-derived PES to provide positioning information at such frequencies since media-derived PES does not have an associated drift problem. Specifically, the magnitude of the weighting function corresponding to the media-derived PES is set to be higher in a frequency band of 0 to 2 Hz than the weighting functions corresponding to the other received sensor signals, including, for example, the thermal sensor signal.

The noise profile of each incoming sensing signal is analysed across the frequency spectrum of the sensing signals. If the analysis shows that, for example, one of the sensing signals has a smaller noise component in a specific frequency domain, then that sensing signal is dominantly used to design the transfer function of the controller, and, thereby, in the production of the output signal. Relating this discussion to the thermal sensing signal and media-derived PES received at the controller, in a frequency band of 0–2 Hz, the magnitude of the weighting function designated to the media-derived PES is increased compared to that designated to the thermal sensing signal since, in that band, the large noise component of the thermal sensing signal makes it unsuitable for providing positioning information. By contrast, in the 50–500 Hz band, the magnitude of the weighting function designated to the thermal sensing signal is increased compared to the one associated to the media-derived PES since the noise component of the thermal sensing signal is smaller in this band compared to in the 0–2 Hz range.

In the above-described embodiment, desirably, the media-derived position error signal comprises a combination of at least two servo signals, each of which is generated from at least two servo fields on a data storage medium relative to which the scanner is scanned. Preferably, each of the servo-fields comprises respective servo marks in multiple tracks that are aligned along respective track centre lines, the servo marks being displaced by a given unique distance in a cross-track direction relative to the respective track centerlines.

The media-derived PES is preferably generated by using a servo-burst configuration comprising four dedicated storage, or servo-, fields in a data storage medium of a probe-storage device. Each servo-field comprises mutually vertically displaced sequences of indentations, or "bursts", written on multiple tracks parallel to a respective track centerline TCL. The distance between the centres of the same bursts in a cross-track direction, i.e. perpendicular to the tracks is equal to a track pitch TP. It is the specific positional relationship between the centres of the different bursts that is used to advantage for producing two servo signals in quadrature, which when combined provide a more robust PESs.

A corresponding method aspect is also provided where, according to an embodiment of a second aspect of the present invention, there is provided a method for controlling a positioning of a scanner relative to a reference medium comprising the steps of: receiving at least two input signals comprising information on a positioning of an scanner relative to a reference medium; and transmitting an output signal, which is used for controlling the positioning of the scanner, wherein the method further comprises the steps of: designating a corresponding weighting function to each of the at least two input signals, a magnitude of the corresponding weighting function being selected to be in accordance with a noise profile of the input signal to which it has been designated; and using the at least two input signals, each with the corresponding weighting function designated thereto, to design a transfer function of the controller for use in the production of the output signal.

According to an embodiment of a third aspect of the present invention, there is provided a system comprising: a scanner; and a controller according to an embodiment of the first aspect of the present invention, wherein a positioning of the scanner relative to a reference medium is controlled by the controller. In this case, the reference medium is a data storage medium of a probe-based data storage device.

Features of one aspect of the present invention may be applied to any another aspect and vice versa.

In any of the above aspects, the various features may be implemented in hardware, or as software modules running on one or more processors.

BRIEF DESCRIPTION OF THE DRAWINGS

Reference will now be made, by way of example, to the accompanying drawings in which.

DETAILED DESCRIPTION OF PREFERRED EMBODIMENTS OF THE INVENTION

This section is divided into: (i) an overview of the controller; (ii) a description of the associated components/features of the controller; (iii) performance objectives of the controller; (iv) the configuration of the controller that is used in order to meet the performance objectives, and (v) comparison between the performance of the controller with previously-proposed positioning techniques.

i) Overview of the Controller and Associated Features

Figure 1:
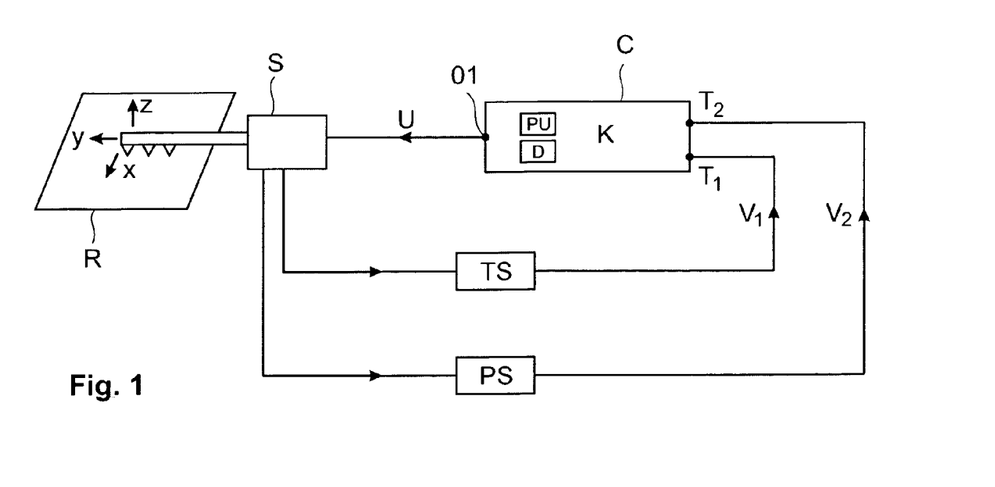
FIG. 1 shows an overview of the controller and components/features associated therewith.

FIG. 1 shows an overview of the controller and components/features associated therewith.

As can be seen from FIG. 1, the controller C has two input terminals T1, T2. Each of the two input terminals T1, T2 is configured to receive one of two input signals v1, v2. The input signals v1, v2 are typically sensing signals comprising information on a positioning of a scanner S relative to a reference medium R, which is typically a data storage medium. The input signal v1 is derived from a thermal sensor TS and is henceforth referred to as the thermal sensing signal v1. The input signal v2 is derived from a media-derived position error signal PES and is henceforth referred to as the media-derived PES v2.

The controller C has a single output terminal O1 connected to the scanner S. The controller C is configured to transmit an output signal u, which is used for controlling the positioning of the scanner S relative to the reference medium R.

The controller C is operated to designate a first weighting function WnL to the thermal sensing signal v1 and a second weighting function WnH to the media-derived PES v2. A magnitude of the first weighting function WnL is selected to be in accordance with a noise profile of the thermal sensing signal v1 to which it has been designated, whereas the magnitude of the second weighting function WnH is selected to be in accordance with a noise profile of the media-derived PES v2 to which it has been designated.

Furthermore, the controller C is operated to simultaneously use the thermal sensing signal v1 and the media-derived PES v2 each with the corresponding weighting function WnL, WnH designated thereto, to design the transfer function K of the controller C for use in the production of the output signal u.

Operation of the controller C to designate the weighting functions WnL, WnH to the thermal sensing signal v1 and media-derived PES v2, respectively, can be performed by a processing unit PU incorporated into the controller C. The processing unit PU is also configurable to simultaneously use the weighted thermal sensing signal v1 and the weighted media-derived PES v2 to design the transfer function K of the controller C.

A drift estimation unit D in the controller C can be operated to perform estimation and/or correction of the effects of drift on either of the thermal sensing signal v1 and the media-derived PES v2. It is, however, mainly the thermal sensing signal v1 that is deteriorated by drift effects at lower frequencies, for example, <50 Hz.

ii) Associated Features

Scanner

As can be seen from FIG. 1, the scanner S is scanned relative to a reference medium R. More particularly, the reference medium R is typically a data storage medium, henceforth also denoted by the reference R, and the scanner S is used to scan a probe or an array of probes relative to the data storage medium R.

The scanner S is scanned in a horizontal axis, x, and a vertical axis, y, which are orthogonally oriented relative to each other and in a plane parallel to the surface of the data storage medium R. Assuming that the motion of the scanner S in the x-axis and its motion in the y-axis are decoupled, the mechanical behaviour of the scanner S in these axes can be modelled by two independent linear differential equations. Specifically, a second order model captures the dynamics of the scanner S. However, this model does not capture the cross-coupling between the x- and y-axes. Cross-coupling is a phenomenon known to exarcebate the performance of scanners due to coupling occurring between the x- and y-motion signals of the scanner S. It is desirable to reduce cross-coupling.

Figure 2:
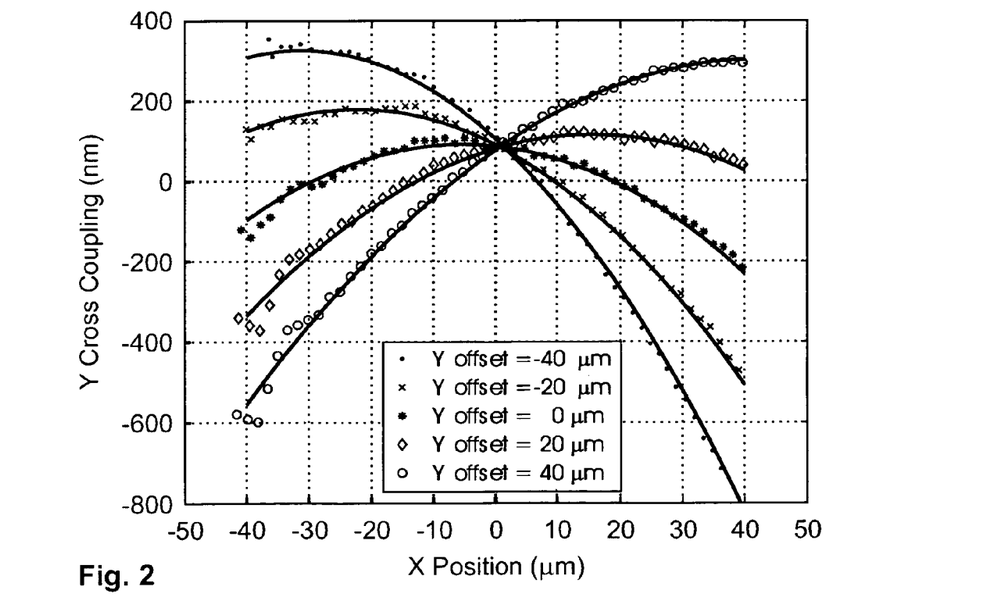
FIG. 2 shows the cross-coupling that occurs between x and y-axes of the scanner.

FIG. 2 shows the cross-coupling that occurs between the x and y-motion signals of the scanner S. As can be seen, the cross-coupling is nonlinear and position-dependent. For the design of the transfer function K of the controller C, cross-coupling is treated as a disturbance signal to be rejected. However, for simulation purposes, a simplified model of the cross-coupling is used. This model is a quadratic fit of the cross-coupling as a function of the position of the scanner S in the x-axis, where the coefficients of the second-order equation change depending on the position of the scanner S in the y-axis. As can be seen from FIG. 2, the measured and the simulated cross-coupling correspond to each other.

Thermal Sensor

One of the sensors that is used in conjunction with the controller C for providing positioning information of the scanner S relative to the data storage medium R is a thermal sensor TS. The sensing signal generated by the thermal sensor TS is the thermal sensing signal v1 received at one of the input terminals T1 of the controller C.

Some advantages associated to the use of a thermal sensor TS are:

(i) Introduction of any additional dynamics by the thermal sensor TS is negligible, which allows the thermal sensor TS to be modelled as a constant gain. The standard deviation of the thermal sensor TS has been measured, for example, to be approximately 2 nm over a 5 kHz bandwidth.

(ii) The operational capability of the thermal sensor TS spans over the entire travel range of the scanner S and, hence, provides global positioning information thereof.

Figure 3:
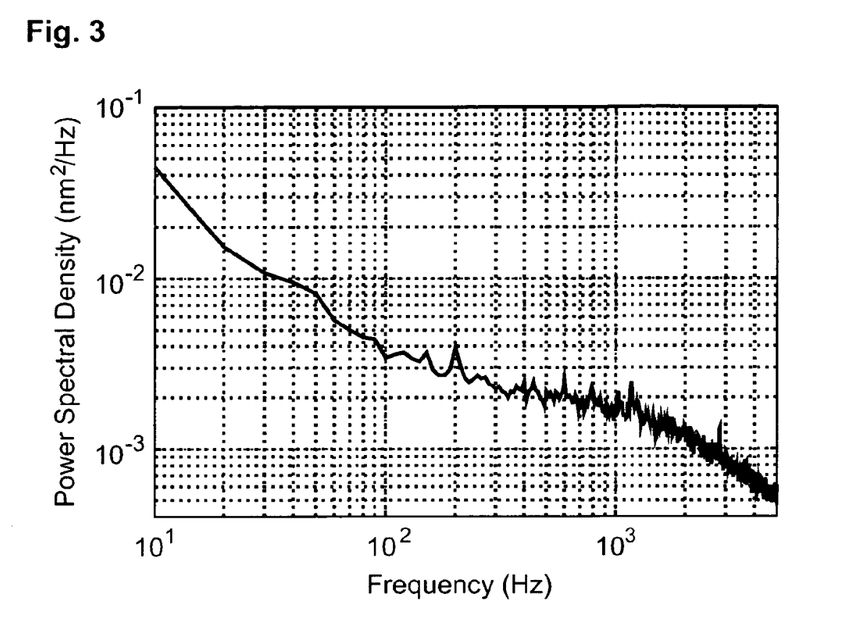
FIG. 3 is a power spectral density measurement of noise of a thermal sensor.

A drawback generally associated to thermal sensors is that they have an increased noise component at lower frequencies, for example, <50 Hz, due to drift and a comparably reduced noise component at higher frequencies, for example, at ≧50 Hz. This can be seen from FIG. 3 that shows a power spectral density measurement of the noise component of a thermal sensor TS used with the controller C.

Global positioning sensors other than a thermal sensor such as, for example, a capacitive sensor may also be used with the controller C. In this case, the capacitive sensor may be designed so as to have reduced power consumption.

Media-Derived Position Error Signal (PES)

Additionally, a media-derived position error sensor PS is used for generating the media-derived PES v2 that is received at one of the input terminals T2 of the controller C and that provides positioning information of the scanner S relative to the data storage medium R.

Figure 4:
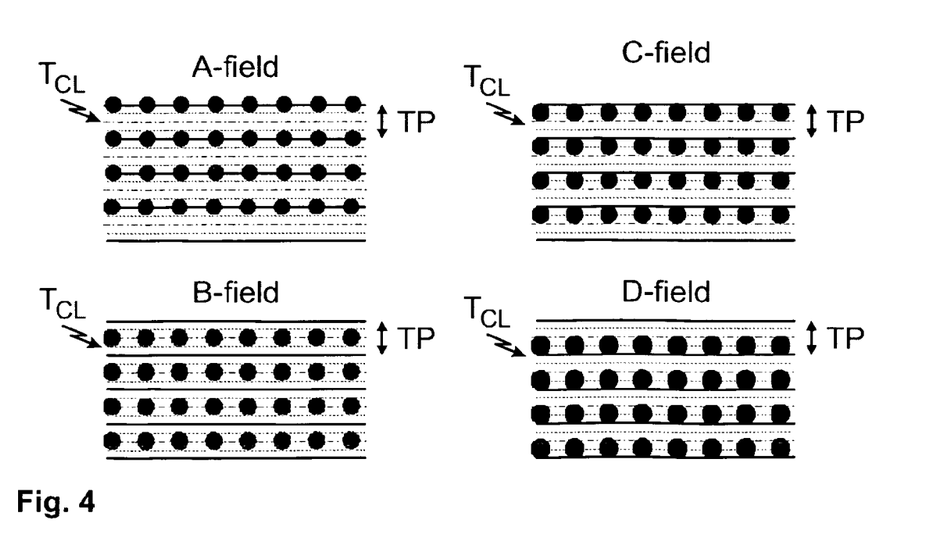
FIG. 4 shows a servo-burst configuration used to generate a media-derived PES.

The media-derived PES v2 is generated by using a servo-burst configuration, an example of which is shown in FIG. 4. As can be seen, four dedicated storage fields, A, B, C and D fields, in the data storage medium R of a probe-storage device are allocated to the production of the media-derived PES v2, these fields henceforth being referred to as servo-fields.

As can be seen from FIG. 4, each servo-field comprises mutually vertically displaced sequences of indentations, or "bursts", written on multiple tracks parallel to and aligned with a respective track centerline TCL. The distance between the centres of the same bursts in a cross-track direction, i.e. perpendicular to the tracks, is equal to a track pitch TP. The distance between the centres of different bursts is either TP/2, this being the case for A and B servo-fields, or C and D servo-fields, or TP/4, which applies to A and C servo-fields. In the case of servo-field B, the track centerline coincides with the centre of the bursts therein. It is this specific positional relationship between the different bursts that is used to advantage for producing two servo signals in quadrature, which when combined provide a more robust media-derived PES v2.

In order to illustrate the principle of how the media-derived PES v2 is generated, it is assumed that the indentations in all the bursts are spaced BP units apart in the x-direction, and that sampling occurs exactly at the indentation centres. Referring to FIG. 4, it is further assumed that a probe-tip is scanned in a y-direction following a line crossing the centres of the indentations. For example, a probe allocated to servo-field A moves from the edge of a top indentation towards its centre, then towards its bottom edge and via an indentation-free region to the next indentation and so on. The amplitude of a readback signal tracking the motion of the probe so scanned is at a maximum at the indentation centre and then decreases with increasing distance from the centre.

Figure 5:
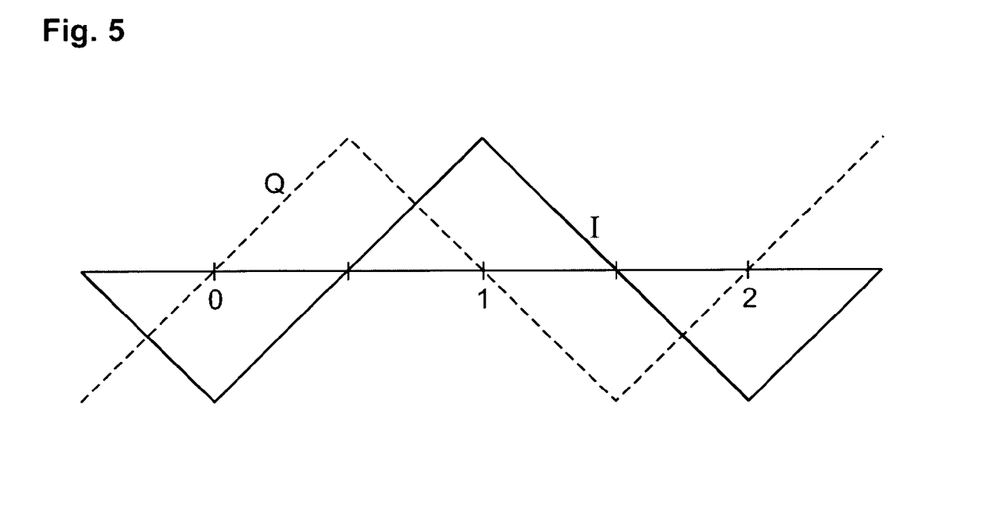
FIG. 5 shows the amplitude of PES signals, in-phase servo-signal I and quadrature servo-signal Q, generated by the configuration shown in FIG. 3, plotted as a function of the scanning motion of the probe in the y-direction.

A PES signal based on the difference in the amplitude of readback signals from bursts A and B is called an in-phase servo-signal I whereas that generated by the difference in the amplitude of readback signals obtained from bursts C and D is called a quadrature servo-signal Q. FIG. 5 shows the amplitude of the in-phase servo-signal I and quadrature servo-signal Q plotted as a function of the scanning motion of the probe in the y-direction. As can be seen, the quadrature servo-signal Q exhibits zero crossings at points where the in-phase servo-signal I has local extrema. A certain combination of the in-phase servo-signal I and quadrature servo-signal Q has zero crossings at all track centre locations, and a linear range of between −TP/2 and TP/2.

The media-derived PES v2 provides positional information around each track centerline and, therefore has a maximum range of TP in the y-direction. Furthermore, a more reliable media-derived PES v2 is only obtained after the probes have traversed one BP while scanning in the x-direction. Thus, it is a discrete signal with a discrete time-step equal to the time taken by the scanner to move the probe by a distance BP in the x-direction.

iii) Performance Objectives

Figure 6:
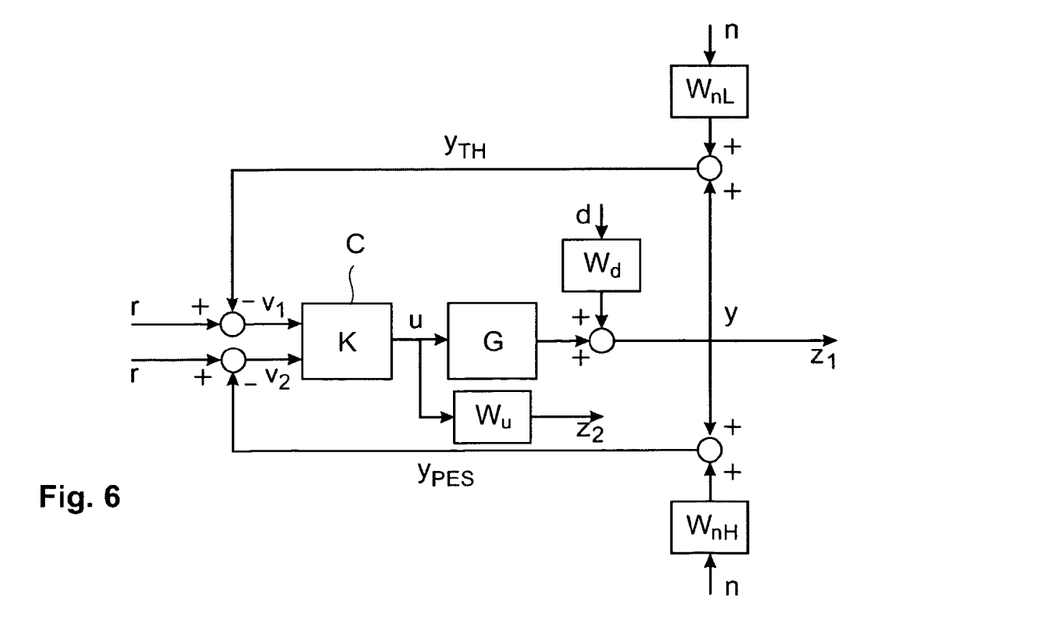
FIG. 6 is used to illustrate the principle of operation of the controller and the performance objectives thereof.

FIG. 6 is used to illustrate the principle of operation of the controller C and the performance objectives thereof.

As can be seen from FIG. 6, the controller C has a "multiple-input single output" MISO structure. The signal y denotes the positioning of the scanner S relative to the data storage medium R in the y-domain. This signal y is monitored via the thermal sensor TS and the media-derived position error signal PS, the latter being generated as described above, and conveyed via a feedback loop to the controller C. Positioning information from the thermal sensor TS is denoted by $y_{th}$ and is conveyed to the controller C via a thermal sensing signal v1. It is assumed that operation is conducted from around a track centre-line and, therefore, that positioning information from a media-derived position error sensor PS is available. Positioning information from the media-derived position error sensor PS is denoted by $y_{pes}$ and is conveyed to the controller C via a media-derived PES v2. The thermal sensing signal v1 and the media-derived PES v2 conveyed to the controller C are simultaneously used to generate an output signal u in accordance with which signal y is controlled.

Factors that would adversely affect the reliability with which the scanner S is positioned relative to the data storage medium R and which would be desirable to reduce are denoted by disturbance signal d and noise signal n. It is also desirable to impose power dissipation constraints on the scanner S.

Frequency Division Control

One of the performance objectives of the controller C is to achieve positioning of the scanner S relative to the data storage medium R. The controller C is designed to achieve this objective by taking into consideration the factor that the thermal sensor TS and the media-derived signal PS each have distinct noise performance characteristics in a predetermined frequency domain respectively associated thereto.

For example, it is known that the noise component of thermal sensors increases at lower frequencies, for example, <50 Hz, due to drift and is comparably reduced at higher frequencies, for example, at ≧50 Hz. This property is exploited in that, in the predetermined frequency domain of 50 Hz to 500 Hz, the thermal sensing signal v1 received by the controller C is dominantly used in the design of the transfer function K thereof, which is used to produce the output signal u driving the scanner S. The media-derived PES v2 is not disabled with preference being given to the thermal sensing signal v1. It is more the case that the output signal u is a function of both the thermal sensing signal v1 and the media-derived PES v2, albeit with the thermal sensing signal component being amplified to be larger than the media-derived PES component in order to exploit its noise performance characteristics in the predetermined frequency domain of 50 Hz to 500 Hz.

The capability of thermal sensors to provide positioning information deteriorates at lower frequencies, for example, <50 Hz, due to the onset of drift. This problem is circumvented by dominantly using the media-derived position error sensor PS to provide positioning information in a predetermined frequency domain of 0 to 2 Hz. Again, the above argument applies in that, in this case, the output signal u is a function of the thermal sensing signal v1 and the media-derived PES v2, with the media-derived PES component being larger than the thermal sensing component of the function.

In order to exploit the frequency-dependent noise performance of the thermal sensor TS and media-derived position error sensor PS in the above-described manner, corresponding weighting functions are designated to the thermal sensor signal v1 and media-derived PES v2. The first weighting function WnL designated to the thermal sensor signal v1 has low-pass filter characteristics that cause the thermal sensing signal v1 to be the preferred signal, i.e. to be dominant in the function used in the production of the output signal u, in the predetermined frequency domain of 50–500 Hz. By contrast, the second weighting function WnH designated to the media-derived PES v2 has a high-pass filter characteristic that render the media-derived PES v2 to be the preferred signal in the predetermined frequency domain of 0 to 2 Hz. Preference of the signal to be used in a predetermined frequency domain, as described above, is implemented by selecting the magnitude of the weighting function designated to that signal accordingly, i.e. if the thermal sensing signal v1 is used, then the weighting function WnL designated thereto is amplified so that it is higher than the second weighting function WnH that is designated to the media-derived PES v2.

The noise profile of each of the input signals v1, v2 received at the input terminals T1, T2, of the controller C is analysed across the frequency spectrum of these signals. If the analysis shows that, for example, one of the signals has a smaller noise component in a specific frequency domain, then that signal is dominantly used to design the transfer function K of the controller C, and, thereby, in the production of the output signal u. Relating this discussion to the thermal sensing signal v1 and media-derived PES v2 received at the controller C, in a predetermined frequency domain of 0–2 Hz, the magnitude of the second weighting function WnH designated to the media-derived PES v2 is increased compared to the first weighting function WnL designated to the thermal sensing signal v1 since, in that domain, the larger noise component of the thermal sensing signal v1 makes it unsuitable for providing positioning information. By contrast, in the predetermined frequency domain of 50–500 Hz, the magnitude of the first weighting function WnL designated to the thermal sensing signal v1 is increased compared to the second weighting function WnH designated to the media-derived PES v2 since the noise component of the thermal sensing signal v1 is smaller.

Disturbances

In order to achieve positioning of the scanner S with nanometer-precision, it is desirable to reduce the effect of disturbances such as, for example, vibrations and mechanical shocks. These disturbances are collectively denoted by d in FIG. 6. Furthermore, cross-coupling is modelled as part of the disturbance signal d to be rejected. Rejection of these disturbances is facilitated by way of a tracking error function Wd that is used in the design of the transfer function K of the controller C. Specifically, since the contribution of cross-coupling to the disturbance signal d is higher than the other aforementioned disturbances at operational frequencies between 0 to 20 Hz of the scanner S, the gain of the tracking error function Wd is amplified at such frequencies.

Control Effort

It is desirable to reduce the power dissipated by the scanner S. For this purpose, a scaling function Wu is used in the design of the transfer function K of the controller C in order to control the magnitude of the output signal u and, by this virtue, impose a power dissipation constraint on the scanner S.

iv) Controller Configuration

The configuration of controller C will now be described with reference to FIG. 6.

In this configuration, the input is defined as $$w = \begin{bmatrix} d \\ n \end{bmatrix},$$

where d denotes the disturbance signal and n represents the noise. Similarly, an error signal, $$z = \begin{bmatrix} z_1 \\ z_2 \end{bmatrix},$$

where $z_1=y$ and $z_2=Wu*u$. Signal y denotes the positioning of the scanner S relative to the data storage medium R in the y-domain, Wu is the scaling function and u is the output signal produced by the controller C.

Linear mapping between the error signal z and input w is achieved via an operator P. Such mapping can be described by the following equation:

$$\begin{bmatrix} z \\ v \end{bmatrix} = P \begin{bmatrix} w \\ u \end{bmatrix} = \begin{bmatrix} P_{11} & P_{12} \\ P_{21} & P_{22} \end{bmatrix} \begin{bmatrix} w \\ u \end{bmatrix} \quad (1)$$

$$u = Kv$$

In equation (1), $$v = \begin{bmatrix} v_1 \\ v_2 \end{bmatrix}$$

is the input to the controller C, namely, the thermal sensing signal v1 and the media-derived PES v2.

It follows from equation (1) that the operator P comprises elements $P_{11}$, $P_{12}$, $P_{21}$, and $P_{22}$ each of which can be represented by:

$$P_{11} = \begin{bmatrix} W_d & 0 \\ 0 & 0 \end{bmatrix}, P_{12} = \begin{bmatrix} G \\ W_n \end{bmatrix}, \quad (2)$$

$$P_{21} = \begin{bmatrix} -W_d & -W_{nL} \\ -W_d & -W_{nH} \end{bmatrix}, P_{22} = \begin{bmatrix} -G \\ -G \end{bmatrix}$$

In equation (2), Wd denotes the tracking error function, G denotes the transfer function of the scanner S, Wu is the scaling function, WnL is the first weighting coefficient designated to thermal sensing signal v1 and WnH is the second weighting coefficient designated to the media-derived PES v2.

In order to meet the performance objectives as discussed above, the controller C is designed to have the transfer function K=[K1, K2] where K1 and K2 are transfer function components respectively denoting the contribution of the thermal sensing signal v1 to the output signal u and the contribution of the media-derived PES v2 to the output signal u.

The linear fractional transformation $F_l(P, K)$, defined as $z = F_l(P, K) w$ is given by:

$$F_l(P, K) = \begin{bmatrix} \dfrac{W_d}{1 + GK_1 + GK_2} & \dfrac{-G(K_1 W_{nL} + K_2 W_{nH})}{1 + GK_1 + GK_2} \\ \dfrac{-W_u W_d (K_1 + K_2)}{1 + GK_1 + GK_2} & \dfrac{-W_u(K_1 W_{nL} + K_2 W_{nH})}{1 + GK_1 + GK_2} \end{bmatrix} \quad (3)$$

The controller C is here designed to minimize:

$$\|F_l(P, K)\|_\infty = \max_\omega \bar{\sigma}(F_l(P, K)(j\omega)) \quad (4)$$

More particularly, the controller C is designed to meet the following criterion:

$$\|F_l(P,K)\|_\infty < \gamma \quad (5)$$

In equation 5 above, if $\gamma \leq 1$, then it is considered that the controller C has met the above-described performance objectives.

The closed-loop transfer function from the disturbance d to signal y denoted by $S_{dis}$ and the closed-loop transfer function from the noise n to signal y denoted by $T_{noise}$ are given by:

$$S_{dis} = \frac{1}{1 + GK_1 + GK_2}, \; T_{noise} = \frac{-GK_1}{1 + GK_1 + GK_2} \quad (6)$$

From equations 3 and 5, it follows that the selection of the tracking error function Wd gives an upper bound on the closed-loop transfer function from the disturbance d to signal y, $S_{dis}$, and therefore captures the disturbance rejection requirements. Also, selection of the weighting functions WnL and WnH determines the distribution of the gain of K1 and K2 as a function of frequency, which determines the desired frequency response for the closed-loop transfer function from the noise n to signal y, $T_{noise}$.

Expressions for the transfer function from reference signals r transmitted to the output of the scanner S denoted by $T_{ref}$ and the transfer function from the reference signals r to an error signal r-y at the output of the scanner S, denoted by $S_{ref}$ are given by:

$$T_{ref} = \frac{GK_1 + GK_2}{1 + GK_1 + GK_2}, \; S_{ref} = \frac{1}{1 + GK_1 + GK_2} \quad (7)$$

From equations 6 and 7, it can be seen that the transfer function from the reference signals r to an error signal r-y at the output of the scanner S, $S_{ref}$, is equal to the closed-loop transfer function from the disturbance d to signal y, $S_{dis}$, as in a one-degree-of-freedom control architecture. Therefore, the constraints imposed on $S_{dis}$ are also valid for $S_{ref}$. Since the main disturbance in the controller C is the cross-coupling, which has similar frequency content to the reference signal, r, there is no need for any additional constraints to be applied.

Based on the above-described criteria, the controller C may, for example, be designed so that the tracking error function Wd is chosen to be:

$$Wd = s + 1257/s + 12.57 \quad (8)$$

Selection of the tracking error function Wd in this way facilitates disturbance rejection capabilities at frequencies of, for example, 0 to 20 Hz extendable up to the bandwidth of operation of the scanner S, for example, 200 Hz.

The frequency region where the thermal sensor positioning information $y_{th}$ may not be suitable for positioning the scanner S due to the onset of drift can be specified by choosing the first weighting function WnL designated to the thermal sensing signal v1 as:

$$WnL = 0.0001 \; s + 12.57/s + 0.1257 \quad (9)$$

Since the noise component of the thermal sensing signal v1 increases at frequencies up to 2 Hz, the first weighting function WnL designated to the thermal sensing signal v1 is selected to have a higher gain at frequencies up to 2 Hz and a lower gain at frequencies of $\geq 50$ Hz.

The second weighting function WnH designated to the media-derived PES v2 is selected to be:

$$WnH = s + 0.03142/s + 314.2 \quad (10)$$

By way of the above selection of the second weighting function WnH the controller C relies more on the thermal sensing signal v1 for the production of the output signal u than the media-derived PES v2 at frequencies $\geq 50$ Hz.

Figure 7:
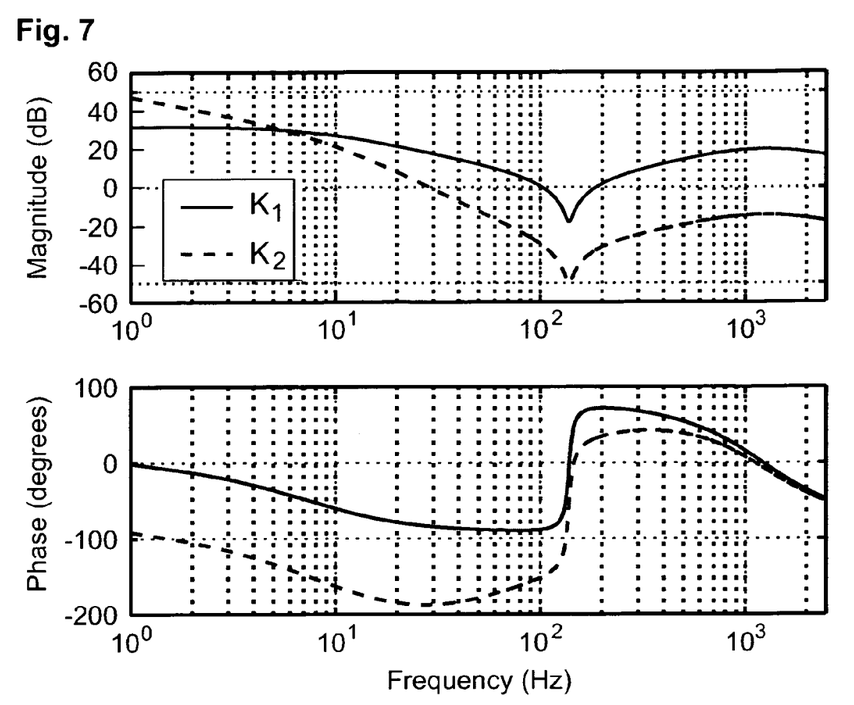
FIG. 7 is a plot of the frequency response of the elements, K1 and K2, of the controller transfer function, K.

A $5^{th}$ order controller C with two inputs T1, T2 and a single output O1 is obtained with the design discussed above. The transfer function, K, of the controller has two elements: K1, which is the transfer function from the thermal sensing signal v1 to the output signal u, and K2, which is the transfer function from the media-derived PES v2 to the output signal u. A plot of the frequency response of K1 and K2 is shown in FIG. 7. As can be seen from FIG. 7, the transfer function K1 using the thermal signal v1 as an input has a smaller gain at lower frequencies than transfer function K2 associated to the media-derived PES v2. The way in which the transfer functions, K1 and K2, vary as a function of frequency, as shown in FIG. 7, allows the controller C to meet the above-described performance objective. The point where K1 and K2 intercept, which specifies where each of the thermal sensing signal v1 and media-derived PES v2 received at the input terminals T1, T2 of the controller C is more dominant, can be changed by modifying the respective weighting functions WnL and WnH designated thereto.

Figure 8:
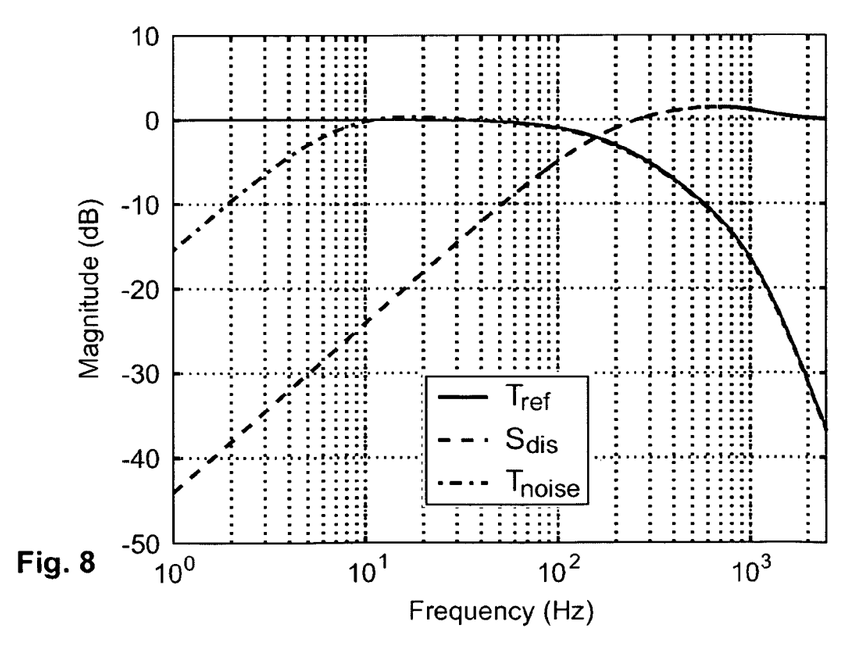
FIG. 8 shows the frequency response of the closed-loop transfer functions $T_{ref}$, $S_{dis}$ and $T_{noise}$ associated with FIG. 7.

FIG. 8 shows the frequency response of the closed-loop transfer function from reference signals r transmitted to the output of the scanner S, denoted by $T_{ref}$, the closed-loop transfer function from the disturbance d to signal y, $S_{dis}$, and the closed-loop transfer function from the noise n to signal y, $T_{noise}$. As can be seen from FIG. 8, the variation of $S_{dis}$ as a function of frequency is so as to reject disturbances approximately up to 130 Hz. Since $S_{ref}$ and $S_{dis}$ are equal to each other, the bandwidth of the closed-loop system, that is the frequency where the magnitude of $S_{ref}$ first crosses −3 dB from below, is 130 Hz. The lower gain of $T_{noise}$ at lower frequencies, −3 dB magnitude at $\leq 10$ Hz, is another indication that the design of the controller C meets the performance objectives as outlined above since any noise input at such frequencies would negligibly affect the scanner motion.

v) Comparison Between the Performance of the Controller C with Previously-Proposed Positioning Techniques.

The performance of the controller C in which positioning information from the thermal sensing signal v1 and the media-derived PES v2 are used simultaneously is compared herebelow with that of a positioning technique where the thermal sensing signal v1 is used in isolation and independently.

Media-Derived PES Generation

Figure 9:
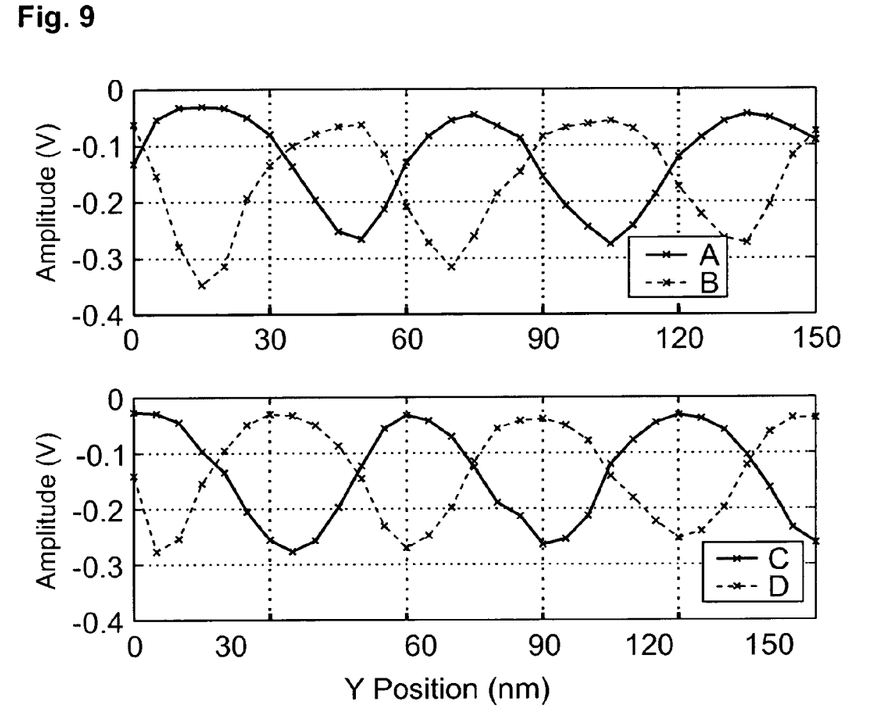
FIG. 9 shows the average indentation depth obtained over each line from the A, B, C and D servo-fields used for the generation of a media-derived PES signal.

For the purpose of generating media-derived PES information in the controller C, bursts were written on a polymer film in servo-fields A, B, C and D using four corresponding cantilevers. The track pitch TP and bit pitch BP were set to 60 nm. Accordingly, the cross-track distance between bursts in the A(C) and B(D) servo-fields was equal to 30 nm. In order to depict the servo-pattern, a scan of 30 lines was performed stepping by 5 nm in the y-direction. Four samples of the readback signal per written indentation were used to correlate with a typical indentation shape and measure the indentation depth. The average indentation depth obtained over each line from the servo-fields A, B, C and D is shown in FIG. 9. The resulting in-phase servo-signal I and quadrature servo-signal Q are shown in FIG. 10.

Figure 10:
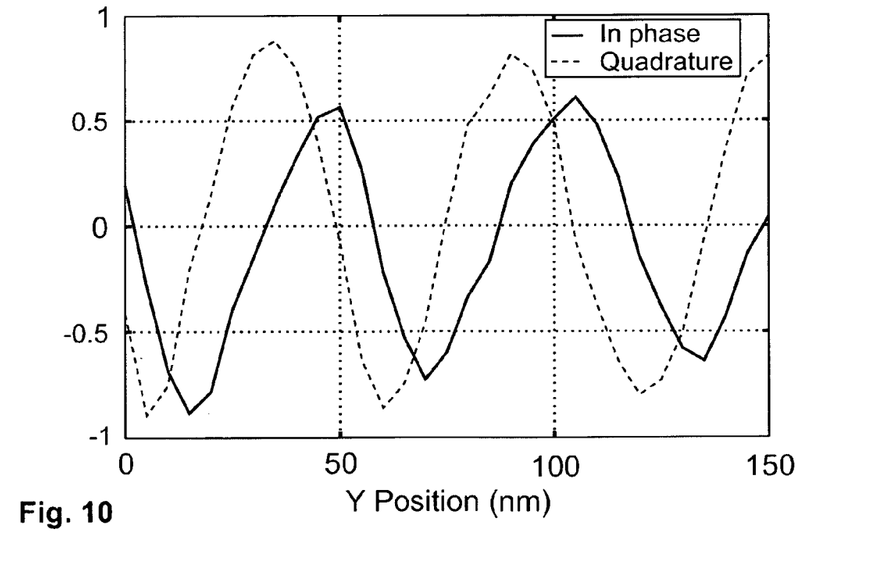
FIG. 10 shows respective in-phase servo-signal I and quadrature servo-signal Q resulting from the readback signals of FIG. 9.

It can be seen from FIG. 10 that the zero crossings of the quadrature servo-signal Q align with the positions of the maximum signal of the bursts in either of the servo-fields A or B with the zero crossing with positive slope corresponding to the bursts in the servo-field B.

In the controller C, only the quadrature servo-signal Q is used for the media-derived PES v2. This does not result in a loss of generality; it solely results in a further reduction in the range of the media-derived PES signal v2.

Sole Thermal-Sensor Based Control

Figure 11:
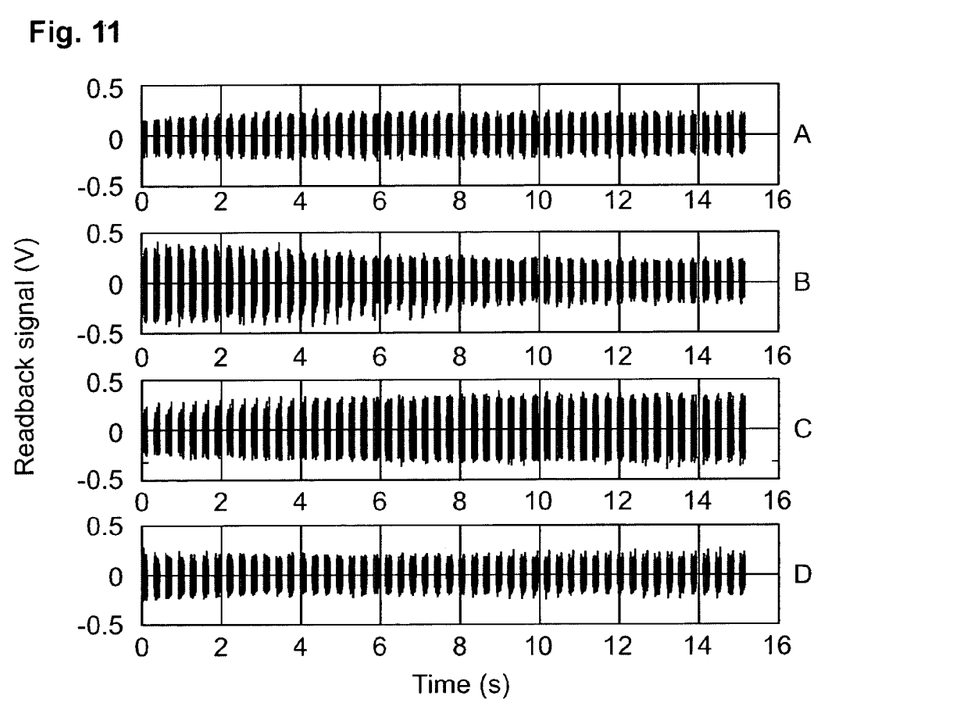
FIG. 11 shows the readback signals from four cantilevers in a positioning technique using thermal sensors solely.

A control architecture for a scanner as disclosed in, "A servo-mechanism for a micro-electro-mechanical-system-based scanning probe storage device" by A. Pantazi et al., Nanotechnology, Vol. 15, pages 612–621, August 2004, in which the x-y positional information of the probes was achieved solely by thermal position sensors, was used to perform a simultaneous read operation using four cantilevers as described above. The four cantilevers were scanned along the x-direction with a linear velocity of 0.3 nm/µs and with the reference signal on the y-axis being kept constant to a position close to the track centreline of the cantilever associated to servo-field B. FIG. 11 shows the readback signal from the four servo-fields A, B, C and D for 50 scans.

It can be seen from FIG. 11 that, although the y-axis reference is kept constant, the magnitude of the readback signal from servo-field B is higher in the first few scans but decreases in the later scans. This means that the tip moves from a position close to the centre of the indentations towards the edges and finally completely out of the indentations. On the contrary, the magnitude of the signal from servo-field C is smaller in the first few scans but increases and stabilizes to a higher value in the last scans. This is better observed from FIG. 12, which is a plot of the average magnitude of the indentation depth over each line scan.

Figure 12:
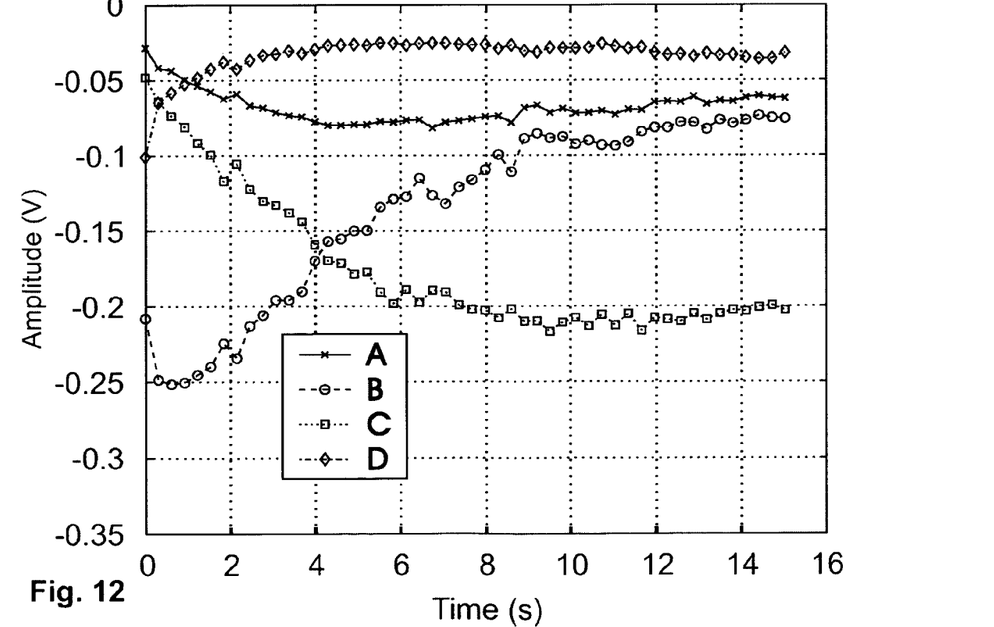
FIG. 12 is a plot of the average magnitude of the indentation depth over each line scan conducted per cantilever in the positioning technique forming the basis of FIG. 11.

The behaviour depicted in FIG. 12 can be explained by the effects of drift on the thermal sensor signal that would be erroneously used by the thermal sensor based controller to correct the position of the scanner. Since the distance between the centre of the bursts in the servo-fields B and C is TP/4, i.e. 15 nm in the present case, an estimated value of the drift is between 15 nm and 30 nm.

Figure 13:
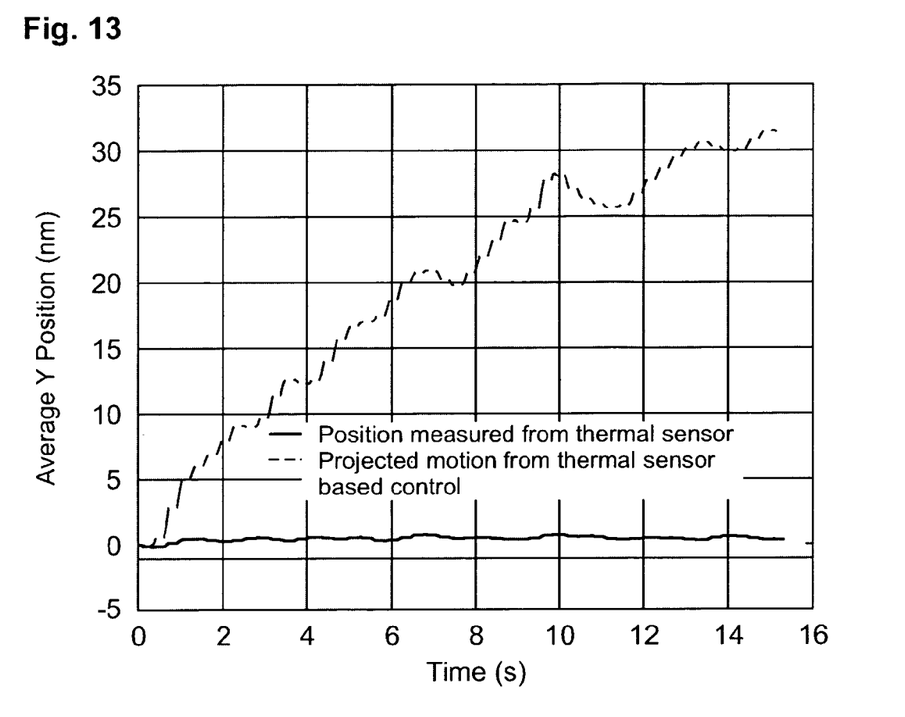
FIG. 13 shows the y-motion calculated from the control effort in the positioning technique using thermal sensors solely.

A signal output from the thermal sensor based controller to control positioning of the scanner can also be used to measure the motion of the scanner in the y-direction. Subtracting a magnitude of the signal output from the thermal sensor based controller to control the positioning of the scanner to perform the first scan from that of the subsequent scans is a measure of the drift. This is based on the assumption that cross-coupling remains constant between successive scans, which is valid since the motion in the x-axis remains the same for all the scans and the y-reference is constant. FIG. 13 shows the y-motion as calculated in the above-described manner, from which it can be seen that the estimated drift is 30 nm at the end of the 50 scans, in accordance with the previous result. In FIG. 13, the y-motion as measured from the thermal sensors appears constant, as the thermal sensor based controller has corrected for the drift. These results clearly show the adverse effects of drift on the noise profile of thermal sensors, especially at lower frequencies.

Controller C

The following discussion will be used to illustrate the drift estimation capability of the controller C and also to compare the performance thereof to the previously-described case where thermal sensors were solely used for providing positioning information of the scanner.

Figure 14:
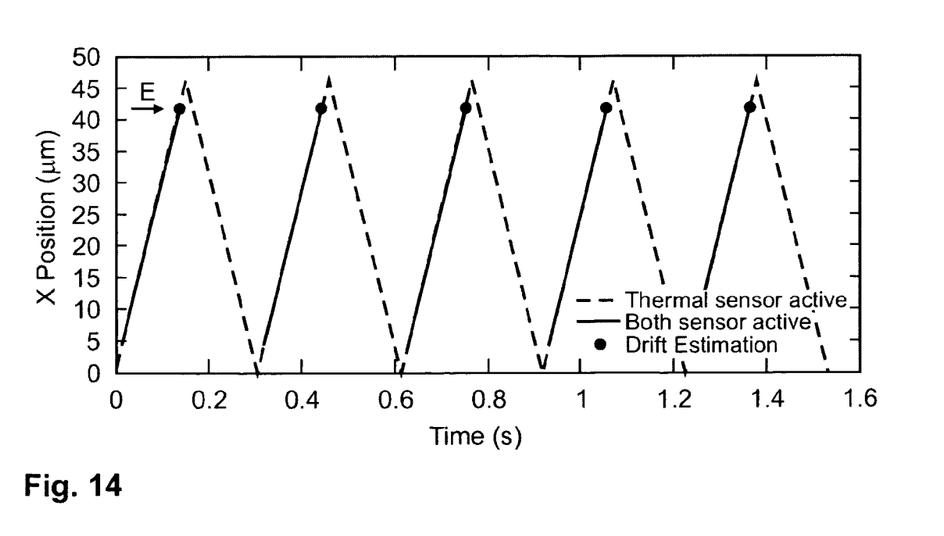
FIG. 14 illustrates the drift estimation capability of the controller.

The above measurements were repeated using the controller C realised in a digital signal processor. The measurements were conducted by engaging both the thermal sensor TS and the media-derived position error sensor PS when scanning the data tracks in the positive scan direction, i.e. increasing in the x-direction. The media-derived position error sensor PS was set to zero and control exclusively conducted by the thermal sensor TS in the negative scan direction, i.e. direction converse to the positive scan direction, since no data collection occurs in the negative scan direction. This has been illustrated in FIG. 14, which shows the x-motion of the scanner S controlled in accordance with the controller C plotted as a function of time. The solid line in FIG. 14 represents the case when both the thermal sensor TS and the media-derived position error sensor PS are active, i.e. the scan is conducted in the positive scan direction, and the hashed line represents the case when only the thermal sensor TS is active, i.e. the scan is conducted in the negative scan direction. Due to the "multiple-input single-output" structure of the controller C, there is no need to switch between different controllers when one of the sensor signals is disengaged or not available.

In this specific case, and referring to FIG. 14 it can be seen that, just before the scan in the positive direction is completed, the controller C is configured to estimate the extent to which the thermal sensing signal v1 has been deteriorated by the effects of drift during the course of the positive scan. The point at which such estimation occurs is denoted by the reference numeral E on FIG. 14. These drift estimation results are used to complete the positive scan and, more importantly, to conduct the negative scan where control of the scanner S is handled solely by the thermal sensing signal v1—engaging the media-derived PES signal v2 at this stage would result in unnecessary usage of processing power since no additional data is collected from the tracks, this already having been done in the positive scan direction, it being preferable that the probe retraces its path along the track to reach the end thereof and subsequently be moved to the next data track. The thermal sensing signal v1 used to perform the negative scan is corrected in accordance with the drift estimation results so that the probe can retrace its path along the already-scanned data track without being displaced between tracks. The latter would be undesirable as the media-derived PES signal v2 would then have to be engaged to determine the position of the scanner S relative to adjacent tracks without any data collection taking place.

Figure 15:
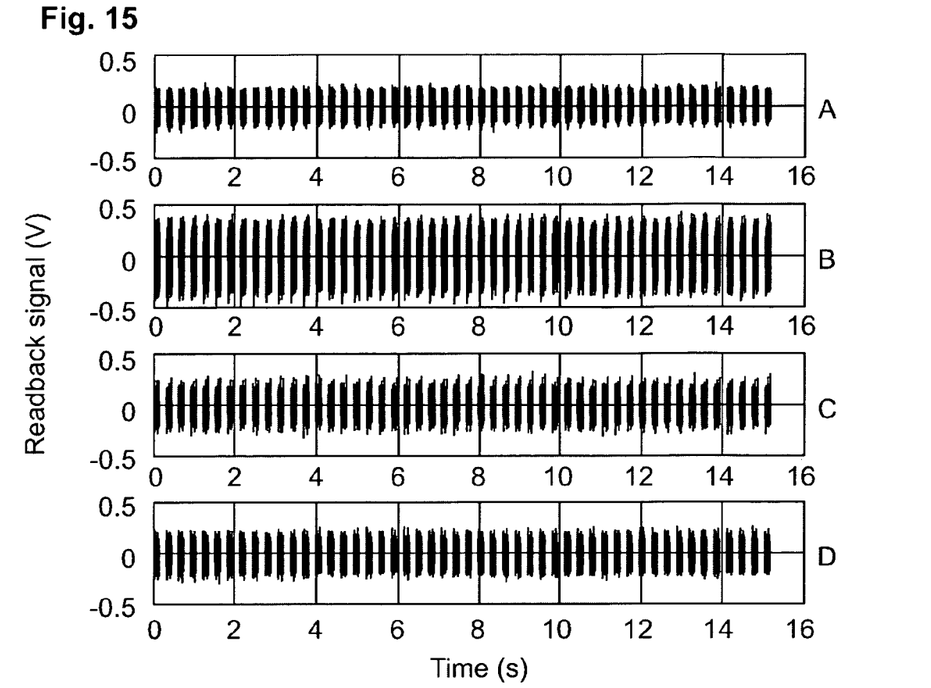
FIG. 15 shows the readback signals from four cantilevers obtained using the controller.
Figure 16:
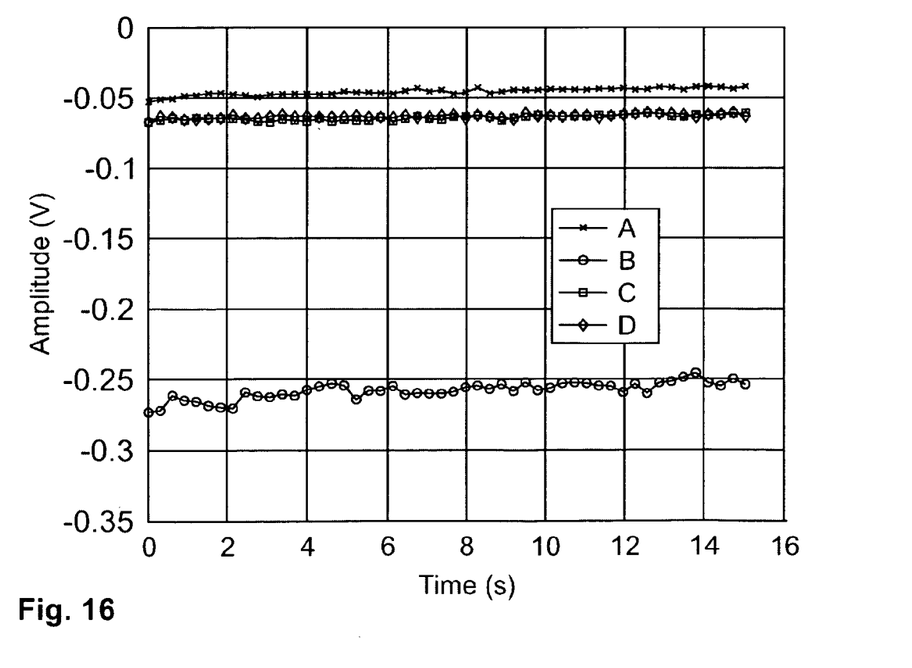
FIG. 16 is a plot of the average magnitude of the indentation depth over each line scan conducted per cantilever in the measurement of FIG. 15.

The above-described control architecture was used to repeat the above measurements described in relation to thermal sensors being used solely for controlling the scanner positioning. FIG. 15 shows the readback signal from the four servo-fields A, B, C and D for 50 scans. As can be seen, the magnitude from servo-field B remains higher than the respective magnitudes of each of the other servo-fields throughout the measurement. FIG. 16 shows the average magnitude of the indentation depth over each line scan. This result shows that the probe of the cantilever associated with servo-field B is always on top of the centre of the bursts in servo-field B and the other three probes respectively associated to the cantilevers associated to servo-fields A, C and D are outside of the bursts in those fields. As the centres of the bursts in servo-field B were defined as the track-centre-lines, the tracking requirement is satisfied and tracking is negligibly affected by the noise component of thermal sensors TS that typically exists below 50 Hz.

Figure 17:
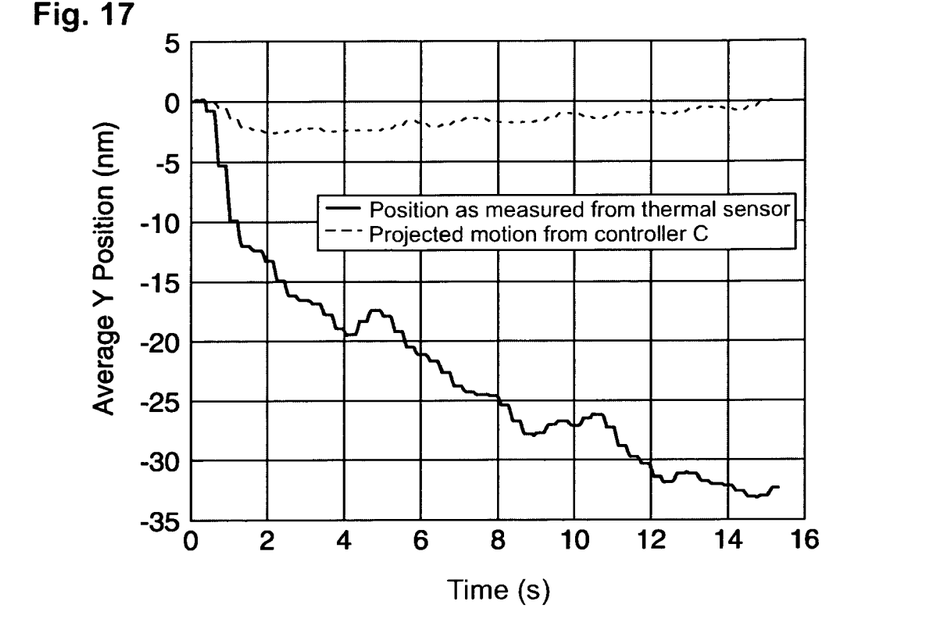
FIG. 17 shows the projected y-motion from the output of the controller as operated in FIG. 15 and the y-motion as measured solely by the thermal sensor.

This result can be verified again from the y-motion of the scanner S as projected from the controller C as shown in FIG. 17. The dashed line in FIG. 17 denotes the projected y-motion from the controller C and the solid line denotes the y-motion as measured by the thermal sensing signal v1. As can be seen, the y-motion remains constant even though the thermal sensor TS indicates a motion of around 30 nm. Thus, in this case, the thermal sensor drift does not deteriorate the scanner motion.

Figure 18:
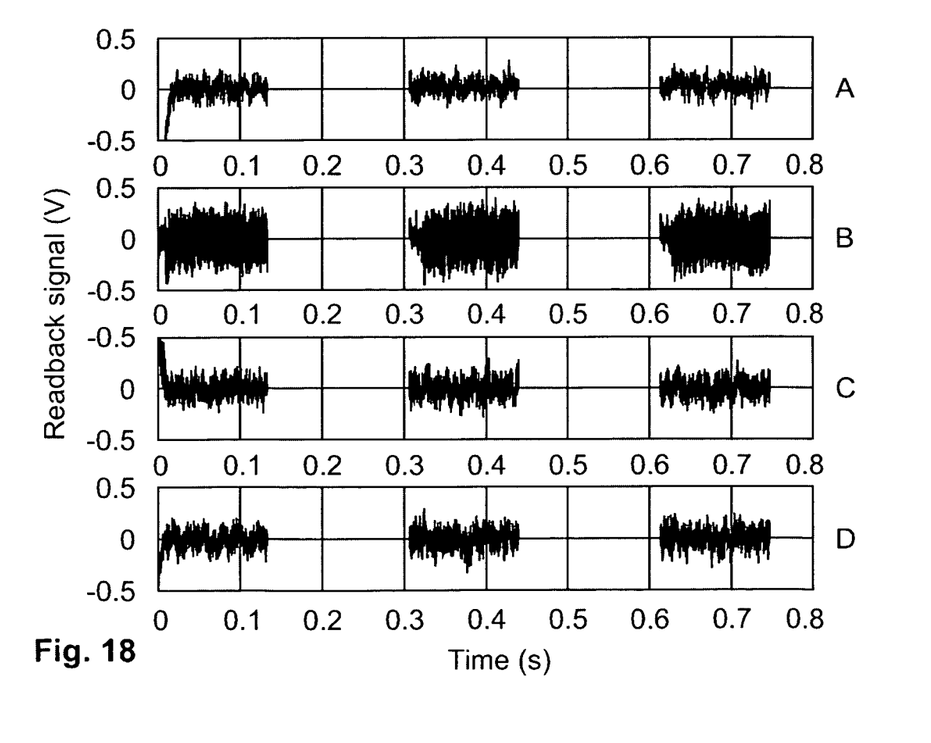
FIG. 18 shows the readback signals from the controller as operated in FIG. 15 while navigating through three different data tracks.

FIG. 18 shows the readback signal from the four cantilevers respectively associated to servo-fields A, B, C and D while navigating through three different tracks. Again, it can be seen that the signal from the cantilever associated to servo-field B is highest out of all the cantilevers throughout the measurement. This indicates that positioning of the probes of the respective cantilevers associated to servo-fields A, B, C and D can be conducted so as to follow data tracks in those fields without adversely being affected by the performance characteristics of the sensing signals and especially by thermal-sensor associated drift.

The present invention may be used in a diverse range of applications including typical storage devices such as probe-storage devices and tape-drives. Furthermore, it can also be implemented in cantilever-based systems for the investigation of biological systems at the molecular level.

Whilst the present invention has been described with reference to thermal sensors and media-derived PES in conjunction, it is not restricted thereto and can be implemented by a combination of other positioning sensors that have different performance characteristics in different frequency regions.

The present invention may be implemented using software modules running on a processor, for example, a digital signal processor. The programming of such modules will be apparent to the skilled person from the description of the various functions. Such modules may be programmed on any appropriate processor using any appropriate programming language. Alternatively, some or all of the functions described above may be implemented using dedicated hardware.

Each feature disclosed in the description, and (where appropriate) the claims and drawings may be provided independently or in any appropriate combination.

The present invention has been described above purely by way of example and modifications of detail can be made within the scope of the invention.

The invention claimed is:

1. A controller comprising:
   at least two input terminals, each of which is configured to receive one of at least two input signals comprising information on a positioning of a scanner relative to a reference medium, and
   an output terminal, which is connectable to the scanner and configured to transmit an output signal for controlling the positioning of the scanner,
   wherein the controller further comprises:
   a processing unit being operable to designate a corresponding weighting function to each of the at least two input signals, a magnitude of the corresponding weighting function being selected to be in accordance with a noise profile of the input signal to which it has been designated;
   the processing unit further being operable to simultaneously use the at least two input signals, each with the corresponding weighting function designated thereto, to design a transfer function of the controller for use in the production of the output signal.

2. A controller as claimed in claim 1 wherein the magnitude of the corresponding weighting function is selected to be in accordance with the noise profile of the input signal to which it has been designated in a predetermined frequency domain.

3. A controller as claimed in claim 1 further comprising a drift estimation unit operable to estimate and/or correct for an effect of drift in any one of the at least two input signals.

4. A controller as claimed in claim 1 wherein the processing unit is further operable to use a tracking error function to design the transfer function of the controller.

5. A controller as claimed in claim 4 wherein the processing unit is further operable to use the tracking error function in order to select a bandwidth of operation of the scanner.

6. A controller as claimed in claim 1 wherein the processing unit is further operable to use a scaling function to design the transfer function of the controller, a magnitude of the scaling function being selected to be in accordance with a magnitude of the output signal.

7. A controller as claimed in claim 1 wherein at least one of the linear fractional transformation of the transfer function of the controller, a transfer function of the scanner controlled in accordance with the controller, the corresponding weighting function designated to each of the at least two input signals, and the tracking error function and the scaling function is $\leq 1$.

8. A controller as claimed in claim 1 wherein one of the at least two input signals is a thermal sensing signal.

9. A controller as claimed in claim 8 wherein the magnitude of the weighting function designated to the thermal sensing signal is selected to be in accordance with the noise profile of the thermal sensing signal in the predetermined frequency domain comprising 50 Hz to 500 Hz.

10. A controller as claimed in claim 8 wherein the other of the at least two input signals is a media-derived position error signal.

11. A controller as claimed in claim 10 wherein the magnitude of the weighting function designated to the media-derived position error signal is selected to be in accordance with the noise profile of the media-derived position error signal in the predetermined frequency domain comprising 0 to 2 Hz.

12. A controller as claimed in claim 10 wherein the media-derived position error signal comprises a combination of at least two servo signals, each of which is generated from at least two servo fields on the reference medium relative to which the scanner is scanned.

13. A controller as claimed in claim 12 wherein each of the servo-fields comprises respective servo marks in multiple tracks that are aligned along track centre lines, the servo marks being displaced by a given unique distance in a cross-track direction relative to the respective track centerlines.

14. A method for controlling a positioning of a scanner relative to a reference medium comprising the steps of:
  receiving at least two input signals comprising information on a positioning of an scanner relative to a reference medium; and
  transmitting an output signal, which is used for controlling the positioning of the scanner,
wherein the method further comprises the steps of:
  designating a corresponding weighting function to each of the at least two input signals, a magnitude of the corresponding weighting function being selected to be in accordance with a noise profile of the input signal to which it has been designated; and
  using the at least two input signals, each with the corresponding weighting function designated thereto, to design a transfer function of the controller for use in the production of the output signal.

15. A system comprising: a scanner; and a controller according to claim 1, wherein a positioning of the scanner relative to a reference medium is controlled by the controller.

16. A system as claimed in claim 15 wherein the reference medium is a data storage medium of a probe-based data storage device.

* * * * *